(12) United States Patent
Sun et al.

(10) Patent No.: US 12,116,272 B2
(45) Date of Patent: Oct. 15, 2024

(54) GREEN PRODUCTION PROCESS FOR IODATE

(71) Applicant: TAIAN HAVAY GROUP CO., LTD, Shandong (CN)

(72) Inventors: Guibin Sun, Tai'an (CN); Jiawang Wang, Tai'an (CN); Hecun Li, Tai'an (CN); Shuzhen Ren, Tai'an (CN)

(73) Assignee: TAIAN HAVAY GROUP CO., LTD, Tai'an (CN)

( * ) Notice: Subject to any disclaimer, the term of this patent is extended or adjusted under 35 U.S.C. 154(b) by 502 days.

(21) Appl. No.: 17/608,773

(22) PCT Filed: Apr. 28, 2020

(86) PCT No.: PCT/CN2020/087407
§ 371 (c)(1),
(2) Date: Nov. 4, 2021

(87) PCT Pub. No.: WO2020/244343
PCT Pub. Date: Dec. 10, 2020

(65) Prior Publication Data
US 2022/0298016 A1 Sep. 22, 2022

(30) Foreign Application Priority Data

Jun. 4, 2019 (CN) .......................... 201910483876.9

(51) Int. Cl.
C01B 11/22 (2006.01)
C25B 1/14 (2006.01)
C25B 1/24 (2021.01)

(52) U.S. Cl.
CPC ................ *C01B 11/22* (2013.01); *C25B 1/14* (2013.01); *C25B 1/24* (2013.01)

(58) Field of Classification Search
CPC .............. C25B 1/14; C25B 1/24; C01B 11/22
See application file for complete search history.

(56) References Cited

U.S. PATENT DOCUMENTS 3,839,550 A * 10/1974 Wentorf .................. C01B 3/061
423/658.2

FOREIGN PATENT DOCUMENTS

| CN | 86100607 A | 8/1987 | |
|---|---|---|---|
| CN | 1078504 A | 11/1993 | |
| CN | 1121540 A | 5/1996 | |
| CN | 101078128 A | 11/2007 | |
| CN | 102021600 A | 4/2011 | |
| CN | 208700569 U | * 4/2019 | |
| CN | 110724969 A | 1/2020 | |
| JP | H01-184293 A | 7/1989 | |
| JP | H01-184294 A | 7/1989 | |
| RU | 2563870 C1 | 9/2015 | |
| SU | 865983 A1 | 9/1981 | |
| SU | 1032045 A1 | 7/1983 | |
| SU | 1096307 A1 | 6/1984 | |
| SU | 1366555 A1 | 1/1988 | |
| WO | WO-2010109922 A1 * | 9/2010 | ............... C25B 1/28 |

OTHER PUBLICATIONS

Jul. 16, 2020 Search Repot issued in International Patent Application No. PCT/CN2020/087407.

* cited by examiner

*Primary Examiner* — Ciel P Contreras
(74) *Attorney, Agent, or Firm* — Oliff PLC

(57) ABSTRACT

A method of electrochemical synthesis, and specifically relates to a green production process for an iodate. The process includes preparing lithium iodate by means of an electrolysis method, and then reacting the prepared lithium iodate with an iodide to prepare the iodate. In the process, a mother liquor is recycled, no effluent waste is produced, a product yield is high, and the generation of a large amount of waste salt is avoided. The process is green and environmentally friendly. During the synthesis process of preparing lithium iodate by means of an electrolysis method, using a clean electrolysis process does not require the addition of an oxidant and other additional original auxiliary materials as required by a chemical method, the original auxiliary materials are simple, and a produced iodate product has a high quality.

7 Claims, No Drawings

GREEN PRODUCTION PROCESS FOR IODATE

TECHNICAL FIELD

The invention relates to the field of electrochemical synthesis, and specifically relates to a green production process for an iodate.

BACKGROUND TECHNOLOGY

Iodate is widely used in chemical synthesis, chemical analysis, pesticide, medicine and material industries; some iodates can be used as additives in the food and feed industries.

Take potassium iodate as an example. Potassium iodate can be used as precipitant and standard reagent in chemical analysis; can be used as feed additive in agriculture; can be used as iodinating agent or medicament for preventing and treating endemic goiter and can also be used for organic synthesis; and can be used as additive of trace element iodine in food industry. The existing synthesis methods of potassium iodate mainly include direct electrolysis of potassium iodide to synthesize potassium iodate and potassium chlorate oxidation process.

The direct electrolysis of potassium iodide to synthesize potassium iodate is to add potassium iodide to the anode and add potassium hydroxide to the cathode of diaphragm electrolytic cell, and electrolyze the anode to generate potassium iodate; or electrolyze potassium iodide to obtain potassium iodate in a diaphragm-free electrolytic cell with lead dioxide or graphite as anode. The reaction formula is as follows:

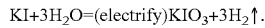

$$KI + 3H_2O = (electrify) KIO_3 + 3H_2\uparrow.$$

One of the main disadvantages of direct electrolytic synthesis of potassium iodate is that due to the low solubility of potassium iodate in water, iodate will precipitate and crystallize with potassium ions, and adhere to the electrode plate or membrane with the increase of the concentration of iodate in the electrolytic process, which will result in increase in energy consumption, damage to equipment, and short circuit of electrode plate crystallization and can also cause safety accidents. Therefore, it is difficult to realize industrial production of potassium iodate synthesized by direct electrolysis.

It is found in our research that all iodates except lithium iodate have little solubility in water, so there are the same problems in the production of other iodates except lithium iodate by this method.

Potassium chlorate oxidation method is the main production method of potassium iodate in industry at present. This method is to use potassium chlorate to directly oxidize iodine in dilute nitric acid solution environment, and then use potassium hydroxide to neutralize potassium hydrogen iodate. The reaction formula is as follows:

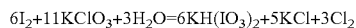

$$6I_2 + 11KClO_3 + 3H_2O = 6KH(IO_3)_2 + 5KCl + 3Cl_2$$

$$KH(IO_3)_2 + KOH = 2KIO_3 + H_2O.$$

Prepare potassium iodate by direct oxidation of potassium chlorate. Chlorine is produced in the reaction process, and pollutes the environment, and a large number of side reaction products are mixed in the product, which is difficult to separate and high cost.

Similarly, if other iodates are produced by chemical synthesis, chlorine will also be produced in the synthesis process just like the synthesis of potassium iodate. Once the leakage causes environmental pollution and safety accidents, chlorine dioxide may be produced in the reaction process of using dangerous chlorate and nitric acid. Chlorine dioxide is extremely unstable and easy to cause explosion accidents. Therefore, it is difficult to realize large-scale and continuous production for chemical synthesis. At the same time, a large amount of by-product chloride will be produced in the process of synthesizing iodate by oxidation, which not only affects the product quality, but also pollutes the environment. Therefore, how to provide a green production process for an iodate has become one of the urgent problems to be solved in this field.

CONTENT OF INVENTION

Aiming at the gaps existing in the prior art, the invention provides a green production process for an iodate. The process comprises preparing lithium iodate by means of an electrolysis method, and then reacting the prepared lithium iodate with an iodide to prepare the iodate, and a mother liquor can be adjusted and then returned to electrolysis. The whole process can form a closed cycle for recycling and reuse, no effluent waste is produced, a product yield is high, and the generation of a large amount of waste salt is avoided. The process is green and environmentally friendly. During the synthesis process of preparing lithium iodate by means of an electrolysis method, using a clean electrolysis process does not require the addition of an oxidant and other additional original auxiliary materials as required by a chemical method, the original auxiliary materials are simple, and a produced iodate product has a high quality.

The main principle of the invention is to take advantage of the characteristic that the solubility of both lithium iodide and lithium iodate is large in water. Prepare lithium iodate by electrolysis lithium iodide first, and then prepare iodate by using lithium iodate as a transition to react with iodide corresponding to the target iodate, and the mother liquor can be returned to the electrolysis system for reuse without producing any waste.

Therefore, the invention is a green preparation process for iodate, which has great significance for the industrial production of iodate.

The specific technical scheme of the invention is as follows:

(1) Preparing an electrolyte containing lithium ions and iodine ions.

(2) Introducing the electrolyte into a electrolysis system and electrifying to carry out an electrolysis reaction to prepare lithium iodate.

(3) Adding an iodide corresponding to a target iodate or substances that can react to produce corresponding iodide to the prepared lithium iodate solution in step (2), and carrying out a reaction to prepare the target iodate.

The iodide described in step (3) is expressed by a molecular formula MIx, wherein M is selected from sodium, magnesium, potassium, calcium, ammonium, cobalt, nickel, zinc, rubidium, strontium, cadmium, indium, cesium, barium, and lanthanum, and x is selected from 1, 2, 3, 4, 5, and 6.

In addition to preparing soluble iodate, the invention can also be widely applicable to preparing insoluble iodate with low purity requirements. However, insoluble iodate with higher purity can only be realized by referring to another method of the inventor (CN110724969A), which will not be repeated here.

Taking the addition of iodide corresponding to the target iodate as an example, the specific reaction equation of the above reaction is:

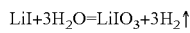
$$LiI+3H_2O=LiIO_3+3H_2\uparrow$$

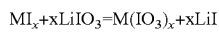
$$MI_x+xLiIO_3=M(IO_3)_x+xLiI$$

Preparing the electrolyte by step (1), a solution containing a certain concentration of lithium iodide can be obtained, which can be directly sent to the next electrolysis system for reaction due to the high solubility of lithium iodide.

Further, soluble dichromate can be selectively added into the electrolyte in step (1) to inhibit the generated iodate from being reduced at the cathode, wherein the cation of soluble dichromate preferably adopts the metal ion in the corresponding target iodate, and more preferably potassium dichromate or sodium dichromate.

Furthermore, a mass concentration of lithium ions is above 0.001%, preferably 0.3%-1.7%, and a pH value is preferably 7-14. A mass concentration of dichromate is preferably but not limited to 0.001%-0.5%.

In the electrolysis system in step (2), the electrolytic cell can be an electrolytic cell with diaphragm or diaphragm-free, preferably a closed diaphragm-free electrolytic cell, the anode is a plate with graphite, lead dioxide or titanium substrate coated with precious metal materials, and the cathode is carbon steel or stainless steel or titanium or other conductive materials, an electrolysis reaction temperature is 0-110° C., a voltage between a single pair of anode and cathode plates is 0.1V-20V, and the electrolyte can be a single batch of intermittent feeding and discharging or continuous feeding and discharging, preferably continuous feeding and continuous discharging.

When the electrolytic cell with diaphragm is used, no dichromate is added.

The further electrolysis reaction temperature is preferably 60-100° C., and the voltage between a single pair of anode and cathode plates is preferably 1V-10V.

The said iodide corresponding to the target iodate or the substances which can react to produce the corresponding iodide in step (3), the amount of iodide added is calculated according to the amount of iodate in the electrolyte in step (2). In order to reduce the concentration of other metal ions in the solution and affect the return and reuse, the molar ratio of iodate to the iodine ion in the above iodide is preferably greater than or equal to 1:1.

Further, the iodide may be the iodide corresponding to the target iodate in step (3), but is not limited to iodide, as long as the iodide substance corresponding to the target iodate can be produced in the system; for example, when preparing potassium iodate, potassium hydroxide and iodine can also be added, or potassium hydroxide and hydroiodic acid can be added, or other substances that can react to produce potassium iodide can be added, besides potassium iodide.

After the reaction is finished, cooling is carried out, and the cooling temperature is preferably −10° C. to +60° C., and the target crude iodate is obtained through solid-liquid separation; the mother liquor is returned to step (1) for reuse.

The iodate obtained through the above three steps is a crude product. If a product of higher purity is required, the crude product needs to be refined to obtain a product that meets the requirements, which can be realized by water washing or recrystallization. After water washing or recrystallization, the mother liquor returns to the refining step for reuse or the same return to step (1) for recycling.

The refined products obtained by water washing or recrystallization can be processed by drying, and the target products can be obtained after passing the test.

The above method takes advantage of the characteristic that the solubility of lithium iodide and lithium iodate in water is larger than that of other iodides and iodates, which avoids the problem of low solubility and easy precipitation and crystallization on the electrode plate or membrane when the existing direct electrolysis of metal iodide to synthesize iodate. The product lithium iodate produced by the electrolysis system in this invention directly exists in the electrolyte in ionic state, which can directly react with the raw materials in the next step to generate the target iodate after entering the next reaction, while lithium ions directly generate lithium iodide, which exists in the mother liquor and can be directly returned to the step 1) to adjust the concentration of each ion.

In the above method, lithium iodate is prepared by electrolysis, and then the prepared lithium iodate reacts with iodide to prepare the iodate. The whole process can form a closed cycle for recycling and reuse, and no effluent waste is produced to take away the product, and the product yield is high, and the generation of a large amount of waste salt is avoided, which is green and environment-friendly. During the synthesis process of preparing lithium iodate by means of an electrolysis method, using a clean electrolysis process does not require the addition of an oxidant and other additional original auxiliary materials as required by a chemical method, the original auxiliary materials are simple, and a produced iodate product has a high quality.

SPECIFIC EMBODIMENTS

The technical scheme of the invention is not limited to the specific embodiments listed below, but also includes appropriate extension according to the contents of the specific embodiments.

Diaphragm-free sealed electrolytic cells are adopted in the embodiments. The anode is preferably a plate coated with precious metals (such as ruthenium, iridium, etc.) on titanium substrate, the cathode is carbon steel, the electrolysis reaction temperature is 75-85° C., the voltage between a single pair of anode and cathode plates is 2V-4V, and the electrolyte can be intermittent feeding and discharging or continuous feeding and discharging, preferably continuous feeding and continuous discharging. Unless otherwise specified, the percentages involved in the embodiments are mass percentage.

Embodiment 1

Preparation of potassium iodate:
Adding 3600 mL of deionized water to a 5000 mL kettle, then adding 632 g of lithium hydroxide (≥56.5%), 1910 g of iodine, and 12.08 g of potassium dichromate to the kettle. Taking samples and detecting the concentration and pH of lithium ions and potassium dichromate, and adding appropriate amount of water, lithium hydroxide, iodine and potassium dichromate according to the detection results to adjust the mass concentration of the final lithium ion to 1.7%, adding potassium dichromate to adjust the mass concentration of the potassium dichromate to 0.2%, and adjusting the pH to 10.1, three batches of electrolyte are prepared according to this ratio and transferred to the electrolyte storage tank for standby.

Adding part of the configured electrolyte to an electrolysis device, raising the temperature to 80° C., starting the cycle, setting a voltage to 3.8V, the mass concentration of the iodate is to 18% by electrolysis, and adding the electrolyte to the electrolysis device continuously and continuously collecting the electrolysis finished solution from the discharge port, and the flow is adjusted through the electrolyte feeding valve to control the mass concentration of the iodate of the extracted electrolysis finished solution to 18%, and the reaction temperature of the electrolysis process is controlled at 80-85° C.

Transferring 4000 g of electrolysis finished solution to another 5000 mL reaction kettle for reaction, adding 242 g of 95% potassium hydroxide and 522 g of iodine, and stirring until there are no iodine particles in the kettle. Cooling the temperature of the solution to 5° C. by the refrigerant, and 612 g of crude potassium iodate is obtained by centrifugal separation. The mother liquor of the double decomposition is transferred to the mother liquor storage tank for preparation and use. Treating two batches according to the above double decomposition reaction steps, a total of 1225 g of crude potassium iodate is obtained.

Adding 4000 mL of deionized water into another 5000 mL reaction kettle, putting 800 g of crude product obtained in the previous step into the reaction kettle for recrystallization, introducing a steam into the jacket of the reaction kettle to raise the temperature of the material to 80° C., adding 2 g of activated carbon, filtering to another 5000 mL reaction kettle through the filter, introducing circulating water to cool down to 30° C., and 391 g wet potassium iodate is obtained by centrifugal separation. The recrystallization mother liquor is introduced into the next batch of recrystallization refining process for recycling, and the wet potassium iodate is transferred to the dryer for drying, 378 g of product is obtained.

The purity index of the obtained product is as follows:

| Items | Actual detection value |
| --- | --- |
| Appearance | White crystal |
| Potassium iodate ($KIO_3$) content, $\omega$/% | 99.1 |
| Loss on drying, $\omega$/% | 0.12 |
| Arsenic (As), $\omega$/% | <0.0003 |
| Heavy metals (calculated by Pb), $\omega$/% | <0.001 |
| Iodide (calculated by I), $\omega$/% | <0.002 |
| Chlorate (calculated by $ClO_3$), $\omega$/% | <0.01 |
| Sulfate (calculated by $SO_4$), $\omega$/% | <0.005 |
| PH (5% potassium iodate solution) | 7.2 |

Embodiment 2

Preparation of potassium iodate (mother liquor recycling):

Taking 4000 mL of double decomposition mother liquor obtained in Embodiment 1, detecting the concentration of lithium ions, potassium ions and potassium dichromate and PH value, and adding appropriate amount of water, lithium hydroxide and iodine according to the detection results to adjust the mass concentration of lithium ions in the solution to 0.8%, the mass concentration of potassium ions to less than or equal to 1.3%, and the mass concentration of potassium dichromate to 0.2%, adjusting the pH to 9.6, and three batches are configured and transferred to the electrolyte storage tank for standby.

Adding the above electrolyte continuously to the stable electrolytic circulation system containing the iodate with mass concentration of 18% in Embodiment 1, and the voltage between cathode and anode of electrolysis is controlled at 3.8V, and continuously collecting the electrolysis finished solution from the discharge port, and the flow is adjusted through the electrolyte feeding valve to control the mass concentration of the iodate of the extracted electrolysis finished solution to 18%, and the reaction temperature of the electrolysis process is controlled at 80-85° C.

Transferring 4000 g of electrolysis finished solution to a 5000 mL reaction kettle for double decomposition reaction, and adding 306 g of 99% potassium iodide, cooling the temperature of the solution to 5° C. by the refrigerant, and 398 g of crude potassium iodate is obtained by centrifugal separation. The mother liquor of the double decomposition is transferred to the mother liquor storage tank for preparation and use. Treating two batches according to the above double decomposition reaction steps, a total of 806 g of crude potassium iodate is obtained.

Adding 4000 mL of the recrystallization mother liquor obtained in Embodiment 1 into a 5000 mL reaction kettle, putting 400 g of crude product obtained in the previous step in Embodiment 2 into the reaction kettle for recrystallization, introducing a steam into the jacket of the reaction kettle to raise the temperature of the material to 80° C., adding 2 g of activated carbon, filtering to another 5000 mL reaction kettle through the filter, introducing circulating water to cool down to 30° C., and 394 g wet potassium iodate is obtained by centrifugal separation. The recrystallization mother liquor is introduced into the next batch of recrystallization refining process for recycling, and the wet potassium iodate is transferred to the dryer for drying, 376 g of product is obtained.

The purity index of the obtained product is as follows:

| Items | Actual detection value |
| --- | --- |
| Appearance | White crystal |
| Potassium iodate ($KIO_3$) content, $\omega$/% | 99.5 |
| Loss on drying, $\omega$/% | 0.08 |
| Arsenic (As), $\omega$/% | <0.0003 |
| Heavy metals (calculated by Pb), $\omega$/% | <0.001 |
| Iodide (calculated by I), $\omega$/% | <0.002 |
| Chlorate (calculated by $ClO_3$), $\omega$/% | <0.01 |
| Sulfate (calculated by $SO_4$), $\omega$/% | <0.005 |
| PH (5% potassium iodate solution) | 7.3 |

Embodiment 3

Preparation of sodium iodate:

Adding 3600 mL of deionized water to a 5000 mL reaction kettle, then adding lithium hydroxide and iodine to the kettle, adjusting the mass concentration of lithium ions to 1.7%, and adding sodium dichromate to adjust the mass concentration of sodium dichromate to 0.15%, and adjusting the PH to 10.6. Four batches of electrolytes are configured according to this ratio and transferred to the electrolyte storage tank for standby.

Adding part of the configured electrolyte to an electrolysis device, raising the temperature to 80° C., starting the cycle, setting a voltage to 3.7V, the mass concentration of the iodate is to 16% by electrolysis, and adding the electrolyte to the electrolysis device continuously and continuously collecting the electrolysis finished solution from the discharge port, and the flow is adjusted through the electrolyte feeding valve to control the mass concentration of the iodate of the extracted electrolysis finished solution to 16%, and the reaction temperature of the electrolysis process is controlled at 80-85° C.

Transferring 4000 g of electrolysis finished solution to a 5000 mL reaction kettle for double decomposition reaction, and adding 207.8 g of 99% sodium iodide, cooling the temperature of the solution to 5° C. by the refrigerant, and 275 g of crude sodium iodate is obtained by centrifugal separation. The mother liquor of the double decomposition is transferred to the mother liquor storage tank for preparation and use. Treating four batches according to the above double decomposition reaction steps, a total of 1110 g of crude sodium iodate is obtained.

Adding 4000 mL of deionized water into another 5000 mL reaction kettle, putting 800 g of crude product obtained in the previous step into the reaction kettle for recrystallization, introducing a steam into the jacket of the reaction kettle to raise the temperature of the material to 80° C., adding 2 g of activated carbon, filtering to another 5000 mL reaction kettle through the filter, introducing circulating water to cool down to 30° C., and 379 g wet sodium iodate is obtained by centrifugal separation. The recrystallization mother liquor is introduced into the next batch of recrystallization refining process for recycling, and the wet sodium iodate is transferred to the dryer for drying, 364 g of product is obtained.

The purity index of the obtained product is as follows:

| Items | Actual detection value |
| --- | --- |
| Sodium iodate ($NaIO_3$) content, ω/% | 99.6 |
| Loss on drying, ω/% | 0.08 |
| Heavy metals (calculated by Pb), ω/% | <0.001 |
| Iodide (calculated by I), ω/% | <0.01 |
| Sulfate (calculated by $SO_4$), ω/% | <0.05 |

Embodiment 4

Preparation of calcium iodate:

Adding 3600 mL of deionized water to a 5000 mL reaction kettle, then adding lithium hydroxide and iodine to the kettle, adjusting the mass concentration of lithium ions to 1.7%, and adding sodium dichromate to adjust the mass concentration of sodium dichromate to 0.15%, and adjusting the PH to 10.6. Three batches of electrolytes are configured according to this ratio and transferred to the electrolyte storage tank for standby.

Adding part of the configured electrolyte to an electrolysis device, raising the temperature to 80° C., starting the cycle, setting a voltage to 3.7V, the mass concentration of the iodate is to 16% by electrolysis, and adding the electrolyte to the electrolysis device continuously and continuously collecting the electrolysis finished solution from the discharge port, and the flow is adjusted through the electrolyte feeding valve to control the mass concentration of the iodate of the extracted electrolysis finished solution to 16%, and the reaction temperature of the electrolysis process is controlled at 80-85° C.

Taking 4000 g of electrolysis finished solution into a 5000 mL reaction kettle, adding 504 g of calcium iodide (the weight calculated by converting the calcium iodide content into 100% when the calcium iodide content is not 100%), stirring, cooling the temperature to 15° C., and filtering to obtain 693.1 g of crude calcium iodate. The mother liquor is added with lithium carbonate to remove calcium and then used for the configuration of the next batch of electrolyte.

Adding 1000 mL of deionized water into a 2000 mL reaction kettle, raising the temperature to 80° C., transferring the crude calcium iodate obtained in the previous step into the reaction kettle, and stirring for 30 min. After filtration, 678.7 g of wet calcium iodate is obtained. The wet calcium iodate is transferred to the dryer and dried to obtain 652.9 g of calcium iodate.

The product analysis results obtained are as follows:

| Items | Actual detection value |
| --- | --- |
| Appearance | Yellow powder |
| Calcium iodate (calculated by I), ω/% | 61.4 |
| Heavy metals (calculated by Pb), ω/% | >0.002 |
| Arsenic (As), ω/% | <0.0005 |
| Chlorate | Pass the test |
| Fineness (passing 180 μm test sieve), ω/% | >95 |

It can be seen that in the invention, lithium iodate is prepared by electrolysis, and then reacting the prepared lithium iodate with an iodide to prepare the iodate, and a mother liquor can be adjusted and then returned to electrolysis. The whole process can form a closed cycle for recycling and reuse, and no effluent waste is produced to take away the product, a product yield is high, and the generation of a large amount of waste salt is avoided. The process is green and environmentally friendly. During the synthesis process of preparing lithium iodate by means of an electrolysis method, using a clean electrolysis process does not require the addition of an oxidant and other additional original auxiliary materials as required by a chemical method, the original auxiliary materials are simple, and a produced iodate product has a high quality.

The invention claimed is:

1. A green production process for an $M(IO_3)_x$ iodate in which M is a cation and x is 1, 2, 3, 4, 5 or 6, comprising:
preparing lithium iodate by
preparing an electrolyte containing lithium ions and iodine ions, wherein a pH of the electrolyte is from 7 to 14, and
introducing the electrolyte into an electrolysis system comprising an electrolytic cell and electrifying to carry out an electrolysis reaction to prepare a lithium iodate solution containing the lithium iodate,
wherein the electrolytic cell includes a diaphragm or is diaphragm-free, the electrolytic cell is closed or open, the electrolytic cell includes at least one pair of an anode and a cathode, wherein the anode comprises a plate with graphite, lead dioxide or titanium substrate coated with precious metal materials, and the cathode comprises a plate with conductive materials, the electrolysis reaction is carried out at a temperature of from 0 to 110° C., a voltage between a single pair of anode and cathode plates is 0.1V-20V, and during the electrolysis reaction, the electrolyte is fed and discharged intermittently or continuously, adding (1) an iodide having a same cation as the $M(IO_3)_x$ iodate, or (2) substances that can react to produce the iodide having the same cation as the $M(IO_3)_x$ iodate, to the lithium iodate solution, and reacting the lithium iodate with the iodide to prepare the $M(IO_3)_x$ iodate.

2. The green production process for the $M(IO_3)_x$ iodate according to claim 1, wherein: a mass concentration of the lithium ions in the electrolyte is above 0.001%; the iodide having the same cation as the $M(IO_3)_x$ iodate is expressed by a molecular formula $MI_x$, wherein M identifies the cation and is selected from the group consisting of sodium, magnesium, potassium, calcium, ammonium, cobalt, nickel, zinc, rubidium, strontium, cadmium, indium, cesium, barium, and lanthanum, and x is selected from the group consisting of 1, 2 and 3.

3. The green production process for the $M(IO_3)_x$ iodate according to claim 1, wherein: a mass concentration of the lithium ions in the electrolyte is 0.3%-1.7%.

4. The green production process for the $M(IO_3)_x$ iodate according to claim 1, wherein: an amount of the iodide having the same cation as the $M(IO_3)_x$ iodate added to the lithium iodate solution is calculated according to an amount of iodate ions ($IO_3^-$) in the electrolyte, and a molar ratio of the iodate ions in the electrolyte to iodine ions contained in the iodide having the same cation as the $M(IO_3)_x$ iodate is greater than or equal to 1:1.

5. The green production process for the $M(IO_3)_x$ iodate according to claim 2, wherein: the mass concentration of lithium ions in the electrolyte is 0.3%-1.7%.

6. The green production process for the $M(IO_3)_x$ iodate according to claim 1, wherein the conductive materials of the cathode plate include carbon steel, stainless steel or titanium.

7. The green production process for the $M(IO_3)_x$ iodate according to claim 1, wherein in the $M(IO_3)_x$ iodate, M is selected from the group consisting of sodium, magnesium, potassium, calcium, ammonium, cobalt, nickel, zinc, rubidium, strontium, cadmium, indium, cesium, barium, and lanthanum, and x is selected from the group consisting of 1, 2 and 3.

* * * * *